United States Patent
Ohshima et al.

[11] Patent Number: 6,063,835
[45] Date of Patent: *May 16, 2000

[54] EMULSION INK AND PRINTING METHOD USING EMULSION INK

[75] Inventors: Kouichi Ohshima, Mishima; Masanaga Imamura, Fujinomiya; Keishi Taniguchi, Susono; Eiichi Kawamura; Hiroshi Adachi, both of Numazu, all of Japan

[73] Assignee: Ricoh Company, Ltd., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/641,359

[22] Filed: Apr. 30, 1996

[30] Foreign Application Priority Data

May 2, 1995 [JP] Japan .................................. 7-132772
Apr. 22, 1996 [JP] Japan .................................. 8-124091

[51] Int. Cl.⁷ .................................................. C09D 5/00
[52] U.S. Cl. .............................. 523/161; 523/84; 523/85; 523/86
[58] Field of Search ................................ 522/84, 85, 86; 523/160, 161

[56] References Cited

U.S. PATENT DOCUMENTS

| | | | |
|---|---|---|---|
| 3,661,614 | 5/1972 | Bassemir | 523/161 |
| 4,358,476 | 11/1982 | Zimmer | 427/44 |
| 4,927,663 | 5/1990 | Small | 427/40 |
| 5,000,937 | 3/1991 | Grollier | 424/47 |
| 5,372,805 | 12/1994 | Finkel | 424/59 |
| 5,380,769 | 1/1995 | Titterington | 523/161 |
| 5,391,685 | 2/1995 | Hitomi | 523/160 |
| 5,459,196 | 10/1995 | Kressdorf | 522/84 |
| 5,501,942 | 3/1996 | Salvin | 522/84 |
| 5,548,005 | 8/1996 | Kurth | 522/84 |
| 5,609,853 | 3/1997 | Hansenne | 424/59 |
| 5,623,001 | 4/1997 | Figov | 523/160 |
| 5,667,765 | 9/1997 | Hansenne | 424/59 |
| 5,672,337 | 9/1997 | Ascione | 424/59 |
| 5,747,009 | 5/1998 | Hansenne | 424/59 |
| 5,753,209 | 5/1998 | Ascione | 424/59 |
| 5,788,973 | 8/1998 | Ascione | 424/401 |

FOREIGN PATENT DOCUMENTS

| | | |
|---|---|---|
| 61-25567 | 11/1986 | Japan . |
| 63-27569 | 2/1988 | Japan . |
| 63-277287 | 11/1988 | Japan . |
| 1-318073 | 12/1989 | Japan . |
| 2-41376 | 2/1990 | Japan . |
| 2-86667 | 3/1990 | Japan . |
| 4-233980 | 8/1992 | Japan . |
| 5-70729 | 3/1993 | Japan . |
| 5-125320 | 5/1993 | Japan . |
| 5-247397 | 9/1993 | Japan . |
| 6-128516 | 5/1994 | Japan . |
| 6-172691 | 6/1994 | Japan . |

OTHER PUBLICATIONS

UV.EB Kokagijutsu no oyo to sijo; Ed. Komeho Tabata, CMC, pp. 8–41.

*Primary Examiner*—Paul R. Michl
*Attorney, Agent, or Firm*—Oblon, Spivak, McClelland, Maier & Neustadt, P.C.

[57] ABSTRACT

Emulsion ink, by which clear images are produced, having excellent drying and fixing properties and preservation stability and does not bleed, strike through or leak. The emulsion ink contains an aqueous emulsified ultraviolet cure compound.

16 Claims, No Drawings

EMULSION INK AND PRINTING METHOD USING EMULSION INK

BACKGROUND OF THE INVENTION

1. Field of the Invention

The present invention generally relates to emulsion ink and printing methods using such ink, and particularly, to emulsion ink having an excellent fixing characteristic for a printing matter and which does not bleed or strike through and which is suitable, especially, for a stencil printing.

2. Description of the Related Art

A stencil printing method, as widely known, is a printing method in which an image pattern made of a number of fine pores is formed on stencil paper. Printing onto a print material such as paper is performed using the stencil paper as a plate and moving ink through the fine pores from one side of the plate to the other side.

There are two types of rotary stencil duplicator—one is a double drum type having a blanket and the other is a single drum type having no blanket. As for the former, soft ink as well as hard ink may be used since there is no case where more than necessary amount of ink is supplied onto print paper. As for the latter, on the other hand, more than a necessary amount of ink may easily be supplied onto print paper if soft ink is used. The ink may easily strike through the paper or leak to an end portion of a master stencil and may cause a mess on a press roller or printed material.

Also, conventional emulsion ink contains solvents having a high boiling point, such as nondrying oil and non-volatile oil (motor oil, liquid paraffin, spindle oil, machine oil, caster oil, etc.) in order to avoid clogging of the pores which could happen if the ink is dried on the stencil plate. However, if the ink is left in a printing machine for a certain period, only water contained in the ink is evaporated and the balance of aqueous phase and organic phase in the ink is disturbed. As a result, the viscosity of the ink is lowered and the ink is softened. Thus, a printing concentration becomes higher than normal and problems such as the bleeding or striking through of the ink are caused.

In order to modify the above mentioned characteristic of the conventional ink, many proposals has been offered and practically carried out. For example, as disclosed in the Japanese Laid-Open Patent Application No.63-255967, the balance of the aqueous and organic phases of ink may be maintained by containing a solvent having an intermediate boiling point in the ink so that the organic phase is also evaporated as the water contained in the ink is evaporated. In the above Japanese Laid-Open Patent Application, oxycarboxylic acid is used for the purpose so that the viscosity of the ink may be properly maintained. In the Japanese Laid-Open Patent Application No.63-277287, the above mentioned problems are avoided by properly setting a thixo coefficient and the viscosity of ink. In the Japanese Laid-Open Patent Application No.1-318073, the problems are prevented by adding acryl resin powder to an oil-based ultraviolet cure type ink having no water content. Similarly, in the Japanese Laid-Open Patent Application No.2-41376, silicone oil is added to the oil-based ultraviolet cure type ink having no water content. Moreover, improvement is made using foam type ink in the Japanese Laid-Open Patent Application No.2-86667.

In the Japanese Laid-Open Patent Application No.4-233980, an improvement in the stability of ink is made by gelatinizing an organic phase to give it a thixotropic characteristic so that the viscosity of emulsion ink is not significantly changed even if the water in the ink is evaporated. In the Japanese Laid-Open Patent Application No.5-70729, a salt of pyrrolidone carboxylic acid derivative having a high hygroscopic characteristic is added to ink to control the water evaporation and an oil whose surface tension is low is used as one of the components for the organic phase in order to improve permeability of the ink to printing paper by increasing the wettability of the ink without changing the viscosity. In the Japanese Laid-Open Patent Application No.5-125320, a volatile solvent whose first distillation point is between about 150 to 210° C. is contained in the organic phase. In the Japanese Laid-Open Patent Application No.5-247397, ink having a low yield value and low flowability at high shear is produced by adding cyclized rubber to the ink. In the Japanese Laid-Open Patent Application No.6-128516, a heat melting component, a thermosetting component and silicone oil are added to ink to improve drying and fixing characteristics of the ink. In the Japanese Laid-Open Patent Application No.6-172691, a wax component is added to ink to avoid the above mentioned problems.

However, despite these improvements, the above mentioned problems regarding conventional ink have not been completely solved. Moreover, printing machines and peripheral equipments have greatly progressed these days with the appearance of high technology such as computers and demands for solving the problems mentioned above are rapidly increasing.

SUMMARY OF THE INVENTION

It is a general object of this invention to provide emulsion ink and a printing method using the emulsion ink in which above-mentioned problems are solved.

A more specific object of the present invention is to provide emulsion ink which does not bleed or strike through and is suitable for use in stencil printing methods. Another object of the present invention is to provide emulsion ink having excellent drying and fixing properties and preservation stability, by which clear images are produced. Another object of the present invention is to provide emulsion ink containing an ultraviolet cure compound of which odor or stimulus of the ultraviolet cure compound is decreased. Another object of the present invention is to provide a printing method using such emulsion ink to produce stencil printing material having no bleeding, striking through or leaking of the ink.

The objects described above are achieved by emulsion ink comprising an organic phase and an aqueous phase wherein at least an aqueous ultraviolet cure compound and a pigment are contained in the emulsion ink.

The objects described above are also achieved by emulsion ink comprising an organic phase and an aqueous phase, wherein at least three weight % of an aqueous ultraviolet cure compound is contained in the aqueous phase. The aqueous ultraviolet cure compound may be an acrylic monomer, an acrylic oligomer, a polyfunctional monomer or a polyfunctional oligomer and the emulsion ink may further comprise an extender. Moreover, the aqueous phase may be made of gel including the aqueous ultraviolet cure compound, and the aqueous compound may include one of a glycol having at least two hydroxyl groups, triethanol amine and a mixture thereof. On the other hand, the organic phase may include an non-ionic surfactant having a HLB value of equal to or less than seven.

According to the above emulsion ink, since the ink contains the aqueous ultraviolet cure compound, the bleeding or striking through of the ink is prevented due to excellent drying and fixing properties of the ink and clear printed images may be obtained.

The objects described above are also achieved by a stencil printing method using the emulsion ink according to the present invention comprising the steps of: (A) forming pores on a thermal stencil sheet using one of a thermal head and a laser beam having a heating function; (B) setting the sheet in a dram of a stencil duplicator; (C) passing the emulsion ink of the present invention through the pores of the sheet; (D) transferring the ink passed through the pores onto a print material, and (E) irradiating ultraviolet rays on the transferred ink. Also, the ultraviolet rays may include infrared rays.

According to the above printing method, since the emulsion ink used contains the ultraviolet cure compound and the ink is irradiated by the ultraviolet rays later on, clear images having no bleeding or striking through of the ink may be obtained and the stencil duplicator will not be messed up by leaked ink.

Other objects and further features of the present invention will be apparent from the following detailed description.

DESCRIPTION OF THE PREFERRED EXAMPLES

In the following, a principle and examples of the present invention will be described in detail.

The emulsion ink according to the present invention is consisting essentially of an organic phase comprising oil components and an aqueous phase comprising aqueous components. The organic phase and the aqueous phase are dispersed and emulsified by adding an appropriate emulsifier and form a water-in-oil emulsion or oil-in-water emulsion. The emulsion ink according to the present invention can have either of these two forms which are chosen depending on conditions. If the ink is to be left on a machine for a long time, the water-in-oil emulsion ink is preferable from the view point of stability of the ink. In general, the emulsion ink according to the present invention is preferably the water-in-oil emulsion ink in which from 90 to 30 weight % of aqueous components are added to from 10 to 70 weight % of organic components. More preferably, the emulsion ink according to the present invention is the water-in-oil emulsion ink in which from 80 to 60 weight % of aqueous components are added to from 20 to 40 weight % of organic components.

The emulsion ink according to the present invention includes, as main components, a solvent having a high boiling point forming an organic phase of the ink, water forming an aqueous phase of the ink, a pigment as a coloring agent, emulsifier and an aqueous ultraviolet cure compound of the present invention. A gelling agent for adjusting viscosity and preventing water evaporation in order to support or include the aqueous ultraviolet cure compound, anti-freezing agent, anti-oxidizing agent, dispersing agent for dispersing pigment, photo polymerization initiator, sensitizer for accelerating reaction, a white pigment for providing thixotropic characteristic, stabilizers and so on may be added if necessary.

The aqueous ultraviolet cure compound according to the present invention has a characteristic of having a high affinity for water. The affinity of the aqueous ultraviolet cure compound for water, expressed by the amount of water in parts by weight which is dissolved or dispersed in 100 parts by weight of the aqueous ultraviolet cure compound, is more than 100/3, preferably more than 100/5, for an oligomer type compound and is more than 100/3, preferably more than 100/10 for a monomer type compound. Also, an oligomer type compound which is dispersed in water, which may be diluted by large amount of water, may be used in the present invention.

If an aqueous ultraviolet cure compound, when mixed with water in the above ratio, becomes transparent or shows turbidity judged by naked eyes, it may be used for the present invention.

As an example, the effect of water dilution of an aqueous UV/EB(electron beam) cure resin AQ-9 (Arakawa Kagaku Kogyo Co.) and a UV/EB cure monomer UK-4153 (Mitsubishi Rayon Co., structural formula is shown below) on their appearances are shown in the following tables.

Structural Formula of UK-4153

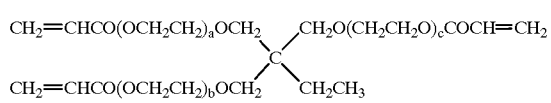

wherein a+b+c=20

AQ-9: aqueous UV cure compound having A value of equal to or more than five.

| Amount of $H_2O$ added A Appearance: | 0 | 2.5 | 5.0 | 7.5 | 10.0 | 12.5 | 15.0 |
|---|---|---|---|---|---|---|---|
| Day 1 | T | T | T | T | T | B | B |
| aft. 1 month | T | T | T | T | T | S | S |

UK-4153: aqueous UV cure compound having A value of equal to or more than ten.

| Amount of $H_2O$ added A Appearance: | 0 | 5.0 | 10 | 15 | 30 | 60 | 100 |
|---|---|---|---|---|---|---|---|
| Day 1 | T | T | T | T | T | T | T |
| aft. 1 month | T | T | T | T | T | T | T |

Note: $H_2O$ added: UV cure compound/$H_2O$ = 100/A (wt. ratio) Appearance: T = transparent, B = turbidity, S = separated The ultraviolet cure compound according to the present invention is not necessarily a compound miscible with water as shown in the above tables. Other examples of the ultraviolet cure compound according to the present invention includes the ones described in, for instance, the following document: "UV·EB kokagijutsu no oyo to sijo; Ed. Komeho Tabata, CMC".

Examples of the above-mentioned ultraviolet cure compounds include a compound having unsaturated bondings at ends or at other than the ends of a molecular chain, whose number average molecular weight is equal to or less than 30000, and a mono or polyfunctional reactive monomer or oligomer having a single or a plurality of unsaturated bonding—for instance, an acrylic compound having an affinity for water such as polyester acrylate, urethane acrylate, epoxy acrylate and polyol acrylate. It is possible to add such compounds in an emulsion state. Also, non-reactive binder polymer may be added to such compounds.

Both hydrophilic and hydrophobic ultraviolet cure compounds may be used, however, the hydrophilic ultraviolet cure compound is used in the present invention and the compound is preferably the one which is dissolved in water with a degree of at least three weight % or is dispersible in water. It is preferable that the compound is included in the aqueous phase.

In general, the ultraviolet cure compound is dissolved or dispersed in the aqueous phase as mentioned above, yet it is possible to add it to the organic phase. Also, it is possible that the compound is contained in both the aqueous and organic phases. There are typically three methods for adding the compound: one is to disperse the compound in the aqueous phase first and then mix the aqueous phase with the organic phase to form an emulsion; two is to disperse the compound in the organic phase first and then mix the organic phase with the aqueous phase; and the last is to emulsify the aqueous phase and the organic phase to produce emulsion ink and then add the compound. Location of the compound after the addition is not completely clear, however, effective concentration of the ink after printing seems to be involved with its cross-linking and hence curing. Any print material may be used in the present invention, however it is preferable to use a one which can accelerate the permeation of ink or which having a coating layer on its surfaces, having an excellent ink absorption property.

Although it has not been determined how the ultraviolet cure compound having a high affinity or dispersibility can bring about the effect of the present invention, it is considered that after the emulsion ink of the present invention is printed on a print material, its aqueous phase including the ultraviolet cure compound rapidly permeates the print material as the emulsion state of the ink is destroyed and, as a result, the concentration of the compound is increased. Thus, the compound is effectively cross-linked by the irradiation of an active radiation such as ultraviolet rays and the ink does not bleed or strike through. In addition, if a compound having a high affinity for oil or, in other words, having a low affinity for water is used, the effect is decreased.

In terms of the above mentioned effect, it is preferable, in general, to use an aqueous or hydrophilic compound. If a compound having relatively low affinity for water is used, however, additives for dispersing the compound may be added. Examples include glycols such as ethylene glycol, diethylene glycol, propylene glycol and polyethylene glycol; polyhydric alcohols such as glycerin, pentaerythritol and sorbitol; amino alcohols such as mono-ethanol amine, di-ethanol amine and tri-ethanol amine; and saccharides.

The aqueous phase according to the present invention generally includes water as a main component and it is possible that the phase is gelatinized or increased in viscosity for adding the water-retention property to it. The gelatinized aqueous phase is effectively used in the present invention.

The amount of the ultraviolet cure compound contained in the aqueous or organic phase, relative to the total weight of the ink, is preferably between three to 30 weight % if it is an oligomer and between three to 40 weight % if it is a monomer. When the oligomer and the monomer are used at the same time, it is preferably between three to 70 weight %. If more than that amount of the compound is added, the stability of the ink is destroyed, and if less than that amount of the compound is added, the effect of adding the compound is hardly noticeable.

Additives such as known photo polymerization initiators and sensitizers for the ultraviolet cure compound may be added, as mentioned above, to the aqueous phase or the organic phase. It is preferable that such additives are added to the aqueous phase if the ultraviolet cure compound is added to the aqueous phase and that the additives are added to the organic phase if the ultraviolet cure compound is added to the organic phase. However, if the compound and the additives come close enough to produce a significant effect on the cross-linking of the ultraviolet cure compound during the concentration process of the ink after printing, the additives may be contained in the phase which does not contain the ultraviolet cure compound. That is, the additives may be added to any portion of the phases which does not interfere with the effective fixing and rapid drying of the emulsion ink onto a printing material by the irradiation of active radiation such as the ultraviolet rays after printing. The amount of the photo polymerization initiator added relative to that of the aqueous ultraviolet cure compound is between one to 40 weight %, and preferably between three to 10 weight %. Similarly, the amount of the sensitizer added relative to the compound is between one to 40 weight %, and preferably between one to 10 weight %.

In general, an ultraviolet cure compound, solvent, resin, pigment, emulsifier, extender and additives such as photo polymerization initiator and sensitizer are added to the organic phase and soluble resin, electrolytes and soluble additives such as antifungal agent and anti-oxidant are contained, if necessary, in the aqueous phase.

Examples of solvents include vegetable oils such as caster oil, linseed oil, tall oil, soybean oil; petroleum type oils having a high boiling point such as spindle oil, liquid paraffin, gear oil and machine oil; synthesized oils obtained by polymerization of unsaturated hydrocarbons such as ethylene, propylene and butene; and oils having an intermediate boiling point such as Isol-300 (Nippon Sekiyu Kagaku Co.), IP-solvent 1620 and IP-solvent 2028 (Idemitsu Sekiyu Kagaku Co.) and Isover-G, Isover-H, Isover-L and Isover-M (Exxon Chemical Co.Ltd.).

The resin component is added for dispersing the pigment or fixing the pigment to print material. Examples of such resins include rosin modified phenol resin, alkyd resin, phenol resin, maleate resin, petroleum resin and rubber derivative resin.

Examples of pigments include well-known pigments such as carbon black, phthalocyanine blue, phthalocyanine green and lake red. The amount of pigment added to the emulsion ink is preferably between 0.5 to 10 weight %.

Emulsifiers used in the present invention are preferably a non-ionic surfactant such as sorbitan fatty acid ester, glycerin fatty acid ester and polyglycerin fatty acid ester. Examples of such emulsifiers include sorbitan higher fatty acid ester such as sorbitan monolaurate, sorbitan monopalmitate, sorbitan monostearate, sorbitan tristearate, sorbitan monooleate, sorbitan trioleate and sorbitan sesquioleate; fatty acid monoglyceride such as oleic acid monoglyceride and oleic acid diglyceride; and ethylene oxide adduct of higher alcohol, alkylphenol and fatty acid.

HLB value is used for expressing the hydrophilicity of surfactants which emulsify the organic and aqueous phases. According to the present invention, a wide range of surfactants having various HLB values may be utilized. In general, an HLB value of between seven to 20 is preferable if the emulsion ink is the oil-in-water type and a value equal to or less than seven is preferable if the ink is the water-in-oil emulsion. In the present invention, since it is preferable that the ink has good preservation stability, a single or a plurality of surfactants having the HLB value of equal to or less than seven is used. The surfactants and the respective HLB values in brackets are shown below.

Sorbitan laurate (7.6), sorbitan palmetate (5.6), sorbitan stearate (5.2), sorbitan oleate (4.6), sorbitan behenate (4.4), sorbitan trioleate (3.0), sorbitan tribehenate (1.5), glycerin monostearate (4.3), glycerin monolaurate (5.4), and tetraglycerin oleate (6.3).

Although the water-in-oil emulsion is preferably used in the present invention, it may be modified to be suitable for a condition used. For example, the ultraviolet cure compound or the polymerization initiator having low solubility to water can be dispersed and emulsified in a water drop of the water-in-oil emulsion. Also, it is preferable that the polymerization initiator may be contained mainly in the organic phase whereas the ultraviolet cure compound may be contained in the water drop or the aqueous phase. If the polymerization initiator and the ultraviolet cure compound are separated, it is preferable for the preservation stability.

Examples of the photo polymerization initiator include acetophenone ketal such as 2-hydroxy-2-methyl-1-phenylpropane-1-one, 2,2-dimethoxy-2-phenyl acetophenone, 1-hydroxy cyclohexyl phenylketone, 2-methyl-2-morpholino(4-thiomethylphenyl)propane-1-one and 2-benzyl-2-dimethylamino-1-(4-morpholino phenyl) butanone; benzophenone such as benzophenone and o-benzoil methyl benzoate; benzoin ether such as benzoin isobutyl ether; thioxanthone such as 2,4-diethyl thioxanthone; acylphosphine oxide and comphorquinone. Also, oligo[2-hydroxy-2-methyl-1-{4-(1-methylvinyl) phenyl}propanone], 4-(2-hydroxyethoxy)phenyl(2-hydroxy-2-propyl)ketone, acrylic benzophenone, (4-benzoilbenzyl)trimethyl ammonium chloride, or if a yellowing of the ink is not so important, amine type accelerator such as triethanol amine, methyldiethanol amine, 4-dimethylamino benzoic acid isoamyl, 4,4-diethylamino benzophenone and N,N-dimethylaminoethyl methacrylate may be used.

Examples of the antifungal agent include aromatic hydroxy compounds and chloride thereof, phenols and derivatives thereof, and sorbic acid, salicylic acid and p-oxybenzoic acid and derivatives thereof.

According to the present invention, as mentioned above, the aqueous phase may be gelatinized or its viscosity may be increased. The viscosity of a resultant ink is preferably between 20 to 400 poises. The compounds which may be used for increasing the viscosity of the ink include extender of white type; aqueous polymer of: natural polymers such as starch, mannan, alginic acid soda, galactan, tragacanth, gum arabic, bluran, dextran, xanthan gum, glue, collagen and casein; half-synthesized polymers such as carboxymethyl cellulose, methyl cellulose, hydroxyethyl cellulose, hydroxypropyl cellulose, hydroxypropylmethyl cellulose, hydroxymethyl starch and dialdehyde starch; synthesized polymers such as polyvinyl alcohol, polyvinyl pyrrolidone, polyacryl amide, polyethylene oxide and polyvinylmethyl ether; and polyacrylic acid and derivatives thereof such as sodium polyacrylate and polyacrylate triethanolamine. It is preferable to add 0.1 to 5.0 weight % of polyacrylic acid and derivatives thereof such as sodium polyacrylate and polyacrylate triethanolamine.

Also, as an accelerator of gelation of the water-soluble polyacrylic acid polymer added to the aqueous phase or for increasing the viscosity, lower amine or alkanol such as di-isopropanol amine, di-2(ethylhexyl) amine, triamyl amine, b-dimethylaminopropio nitrile, dodecyl amine and morpholin or inorganic base such as sodium hydroxide, potassium hydroxide and ammonium hydroxide may be used according to the present invention.

Example of the extender of white type include $SiO_2$, $Al_2O_3$, ZnO, $ZiO_2$, montmorillonite and so on, and it is preferable that 2 to 10 weight % of the extender is added to the emulsion ink according to the present invention.

In the method for producing the emulsion ink according to the present invention, the organic phase is prepared by, first, dispersing the pigment in the above mentioned solvent using a known dispersing apparatus and then diluting the resulting organic phase with the solvent or the other organic component with stirring by a known stirrer. It is preferable to add additives having low affinity to water to the organic phase during an appropriate step of the process. The aqueous phase, on the other hand, is prepared, generally, by dissolving the aqueous components using a known stirrer. In this preparation of the aqueous phase, it is preferable to add additives having a high affinity to water to the aqueous phase during an appropriate step of the process. Finally, the resultant organic phase and the aqueous phase are emulsified using a known emulsifying apparatus and the emulsion ink according to the present invention is produced. The method and means for the dispersion, dilution, emulsion and so on may be appropriately modified.

The use of emulsion ink according to the present invention is not limited to stencil or screen printing and the ink may be used for relief printing, intaglio printing or gravure printing.

In the stencil printing, for example, a number of pores forming an image pattern are produced on a thermal sheet for stencil printing, made of thermoplastic film as a main component, using a thermal head or laser beam having a heating function and the sheet is used as a plate. The plate can be made by superimposing the thermal sheet and a script and irradiate them with infrared light to form pore image corresponding to an imaged portion. The plate is set, for example, in a stencil duplicator and printed matter may be obtained by applying pressure to the plate by a roller on which the ink is applied, extruding the ink to the other side of the plate through the pores, and forming an imaged pattern which is the same as the script on the print material such as a paper. If a rotary stencil press and so on is used, printed matter may be produced using the same process. Immediately after the printed matter is produced, ultraviolet light is irradiated on it. It is preferable to use ultraviolet light containing infrared according to the present invention. Also, it is possible to use infrared together with ultraviolet light. Through this process, rapid fixing and drying of the ink may be carried out.

The ultraviolet light is from an active radiation source in the present invention and may be obtained from a low-pressure ultraviolet lamp, high-pressure ultraviolet lamp, halogen lamp and so on. The wavelength and intensity of the ultraviolet light is preferably suitable for a type of aqueous ultraviolet cure compound and the polymerization initiator used, based their amounts. As mentioned above, it is preferable that the lamp also contains infrared light besides the ultraviolet light. The reason that the use of infrared is preferable is that it is assumed that the infrared light has a function, resulting from its heating ability, of evaporating the volatile component comprising water contained in the ink and concentrate the ink. The ratio of ultraviolet light having a wavelength of 200 to 400 nm compared to the infrared light having a wavelength of 0.8 to 2 $\mu$m is preferably more than 100:0.1, and most preferably more than 100:5.

As mentioned above, according to the present invention, it is possible to firmly fix the ink layer onto a print material, accelerate the drying and fixing of the ink and prevent the striking through of the ink by including the aqueous or hydrophilic ultraviolet cure compound in the ink, performing the printing using the ink and irradiating the ink using the ultraviolet light containing the infrared light.

EXAMPLES

A description will be given of examples of the present invention. However, the present invention is not, by any means, limited to these examples and variations and modifications may be made without departing from the scope of the present invention. In addition, the term "parts" used below means "parts by weight" unless otherwise indicated.

Example 1

Organic Phase

| | |
|---|---|
| Carbon Black (pigment) | 4.5 parts |
| Sorbitan oleate (emulsifier) | 4.5 parts |
| Dibutylhydroxy toluene (antioxidant) | 0.1 parts |
| Spindle oil (solvent) | 19.0 parts |

Aqueous Phase

| | |
|---|---|
| Water | 61.0 parts |
| Paraoxymethyl benzoate (antimold) | 0.1 parts |
| Polyacrylic acid | 0.4 parts |
| Triethanol amine | 0.4 parts |
| Ethylene glycol | 10.0 parts |
| Polymerization initiator (IrugaCure 2959, Chiba Gaiegy Co.) | 1.0 parts |
| UV cure polyfunctional acrylate (UK-4153: Mitsubishi Rayon Co.) | 5.0 parts |

The organic phase was prepared by dispersing carbon black, sorbitan oleate and dibutylhydroxy toluene in spindle oil using a three-roll dispersing apparatus and then diluting the resulting phase with spindle oil. The aqueous phase was prepared by dissolving polyacrylic acid in water in which paraoxymethyl benzoate, ethylene glycol and polymerization initiator had been dissolved and adding triethanol amine in order to adjust pH and gelatinize the mixture and the ultraviolet cure polyfunctional acrylate to produce the aqueous phase. Then the organic phase was added little by little to the stirred aqueous phase to form emulsion ink.

After the foregoing, the below-mentioned ultraviolet cure resin and polymerization initiator were added to the obtained emulsion ink to produce ultraviolet cure emulsion ink.

| | |
|---|---|
| Ultraviolet cure resin (Beamset AQ-7: water-soluble acryl resin, Arakawa Kagaku Co.) | 15.0 parts |
| Polymerization initiator (IrugaCure 184, Chiba Gaiegy Co.) | 3.0 parts |

When printing was performed on ten pieces of normal printing paper using this emulsion ink, clear printing images were obtained. Immediately after the printing, the printed paper was transferred to a belt conveyor and passed under an ultraviolet lamp so that the entire surface of the paper was exposed to the irradiation (irradiation condition: 80 W/cm× one lamp; 10 cm height; aluminium reflective mirror; belt speed 6–18 m/min). When a piece of paper was superimposed with the obtained printed paper and a pressure of 300 g was applied using a roller to evaluate the striking through of the emulsion ink by observing the fixing condition of the ink, it was found that the striking through of the emulsion ink was effectively prevented.

Example 2

Organic Phase

| | |
|---|---|
| Carbon Black (pigment) | 4.5 parts |
| Sorbitan oleate (emulsifier) | 9.5 parts |
| Dibutylhydroxy toluene (antioxidant) | 0.1 parts |
| Spindle oil (solvent) | 19.0 parts |

Aqueous Phase

| | |
|---|---|
| Water | 61.0 parts |
| Paraoxymethyl benzoate (antimold) | 0.1 parts |
| Polyacrylic acid | 0.4 parts |
| Triethanol amine | 0.4 parts |
| Ethylene glycol | 10.0 parts |
| Ultraviolet cure resin (Ecola-Coat #200DA: UV cure varnish, Material Science Co.) | 15.0 parts |

The organic phase was prepared by dispersing carbon black, sorbitan oleate and dibutylhydroxy toluene in spindle oil using a three-roll dispersing apparatus and then diluting the resulting phase with spindle oil. The aqueous phase was prepared by first gelatinizing water in which paraoxymethyl benzoate and ethylene glycol had been dissolved using polyacrylic acid and triethanol amine and then adding the ultraviolet cure resin.

Then the aqueous phase was added little by little to the stirred organic phase to form emulsion ink.

As in the same manner described in Example 1, printed material was obtained using the emulsion ink and striking through of the ink was evaluated.

Example 3

Organic Phase

| | |
|---|---|
| Carbon Black (pigment) | 3.0 parts |
| Sorbitan oleate (emulsifier) | 8.0 parts |
| Dibutylhydroxy toluene (antioxidant) | 0.1 parts |
| Refrigerating machine oil (solvent) | 12.0 parts |
| Polymerization initiator (IrugaCure 184, Chiba Gaiegy Co.) | 3.0 parts |
| Ultraviolet cure resin (Ecola-Coat #200DA: UV cure varnish, Material Science Co.) | 10.0 parts |

Aqueous Phase

| | |
|---|---|
| Water | 60.0 parts |
| Paraoxymethyl benzoate (antimold) | 0.1 parts |
| Polyacrylic acid | 0.4 parts |
| Triethanol amine | 0.4 parts |
| Polymerization initiator (IrugaCure 2959, Chiba Gaiegy Co.) | 1.0 parts |
| UV cure polyfunctional acrylate (UK-4153: Mitsubishi Rayon Co.) | 15.0 parts |

A first order dispersion for the organic phase was prepared in the same manner as described in Example 1 and the organic phase was produced by adding a polymerization initiator, UV cure varnish and solvent. Then the aqueous phase to which the above ultraviolet cure polyfunctional acrylate was added was prepared and the organic phase and the aqueous phase were dispersed and emulsified to produce emulsion ink.

As in the same manner described in Example 1, printed matter was obtained using the emulsion ink and striking through of the ink was evaluated.

Comparative Example 1

In the same manner described in Example 1 except that the ultraviolet ray irradiating step was omitted, printed material was obtained using the emulsion ink and striking through of the ink was evaluated.

The evaluation results are shown in the table below. Note that the obtained ink had no odor and did not stimulate skin. Also, high stability was observed for the ink produced in Example 3.

| Belt Speed (m/min) Surface area | 6 | 9 | 12 | 15 | 18 |
|---|---|---|---|---|---|
| Ex. 1 | E | E | E | E | S |
| Ex. 2 | E | E | E | E | S |
| Ex. 3 | E | E | E | E | E |
| Cp. 1 | L | L | L | L | L |

("Surface area" means the surface area made by striking through of the emulsion ink: E=extremely small; S=small; and L=large.)

Example 4

Organic Phase

| Carbon Black (pigment) | 4.5 parts |
|---|---|
| Sorbitan oleate (emulsifier) | 9.5 parts |
| Dibutylhydroxy toluene (antioxidant) | 0.1 parts |
| Refrigerating machine oil (solvent) | 19.0 parts |
| Polymerization initiator (IrugaCure 184, Chiba Gaiegy Co.) | 1.0 parts |

Aqueous Phase

| Water | 61.8 parts |
|---|---|
| Paraoxymethyl benzoate (antimold) | 0.1 parts |
| Ethylene glycol | 10.0 parts |
| Polyacrylic acid | 0.4 parts |
| Triethanol amine | 0.4 parts |
| Ultraviolet cure resin (Ecola-Coat #200DA: UV cure varnish, Material Science Co.) | 4.0 parts |

A first order dispersion for the organic phase was prepared in the same manner as described in Example 1 and the organic phase was produced by adding the polymerization initiator and solvent. Also, as in the same manner used in Example 2, the aqueous phase was prepared by first dissolving paraoxymethyl benzoate and ethylene glycol to water in order to gelatinize it and then dispersing and dissolving the above ultraviolet cure resin. Finally, emulsion ink was obtained by adding little by little the aqueous phase to the stirred organic phase.

Example 5

Emulsion ink was prepared as in the same manner described in Example 4 except that an aqueous ultraviolet cure varnish (Ecola-Coat CF542MB: Material Science Co.) was used.

Example 6

Emulsion ink was prepared as in the same manner described in Example 2 except that polyester acrylate (Diabeam UK4203: Mitsubishi Rayon Co.) was used as the ultraviolet cure resin.

Example 7

Emulsion ink was prepared as in the same manner described in Example 3 except that epoxy acrylate (Diabeam UK6115: Mitsubishi Rayon Co.) was used as the ultraviolet cure polyfunctional acrylate and that the acrylate was added to the organic phase.

As in the same manner described in Example 1, striking through of the emulsion ink obtained from Examples 4 to 7 was evaluated and the results are shown in the table below. Also, cases in which no ultraviolet light irradiation was carried out are shown in the same table as Comparative Examples 2 to 5, respectively corresponds to the Examples 4 to 7.

| | Ex. 4 | Ex. 5 | Ex. 6 | Ex. 7 | Cp. 2 | Cp. 3 | Cp. 4 | Cp. 5 |
|---|---|---|---|---|---|---|---|---|
| Surface area | E | E | E | E | L | L | L | L |

(Surface area made by striking through of the emulsion ink when ten pieces of paper were printed (belt speed=10 m/min): E=extremely small; and L=large.)

An ink residue test was performed using the emulsion ink obtained in Example 4 and a stencil duplicator (Preport VT3820, RICOH Co., Ltd.). The test was carried out by interrupting a printing process, switching off the main power of the duplicator and leaving the duplicator, without taking out a plate, for one month. After that, switching on the duplicator again to continue the interrupted printing process. As a result, printed materials having a clear image and without bleeding were consecutively obtained in good condition except for the first 15 pieces. The concentration of the ink printed on one to 100 pieces of printing material was measured by a Macbeth densitometer and the results were plotted as shown below. It is noted that bleeding of ink was not observed and the interior of the duplicator was not messed up by the ink.

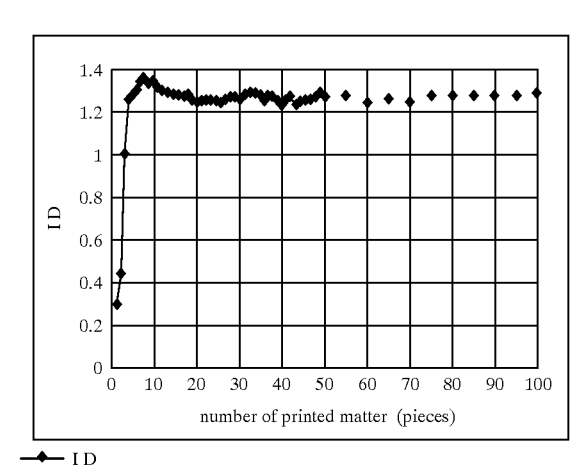

Example 8

Emulsion ink was prepared in the same manner described in Example 4 except that 1.0, 3.0, 5.0 or 10 weight % of the ultraviolet cure resin relative to the total amount of the emulsion ink and that 5 weight % of the photo polymerization initiator relative to the ultraviolet cure resin was added.

Example 9

Emulsion ink was prepared in the same manner described in Example 3 except that 1.0, 3.0, 5.0 or 10 weight % of the ultraviolet cure varnish and the ultraviolet cure polyfunctional acrylate, in total, relative to the total amount of the ink and that 2 weight % of the photo polymerization initiator (IrugaCure 2959) relative to the ultraviolet cure polyfunctional acrylate was added.

In the same manner described in Example 1, striking through of the emulsion ink obtained from Examples 8 and 9 were evaluated and the results are shown in the table below (figures are expressed by "weight %).

| Amount of UV resin added | 1.0 | 3.0 | 5.0 | 10 |
|---|---|---|---|---|
| Ex. 8 Surface area | L | E | E | E |
| Ex. 9 Surface area | L | E | E | E |

("Surface area" means the surface are made by striking through of the emulsion ink when ten pieces of paper were printed (belt speed=10 m/min): E=extremely small; and L=large.)

It is obvious, as shown in the above table, that if at least three weight % of the ultraviolet cure resin relative to the total weight of the ink is used, printed material can be obtained without striking through of the ink.

Example 10

Emulsion ink was prepared as in the same manner described in Example 1 except that a cold mirror (CM) having 20 to 60% transmittance of infrared rays with a wavelength of at least 0.7 $\mu$m, and a 40% cold filter (CF) were used instead of an aluminium reflective mirror of the ultraviolet lamp. Immediately after the printing was completed, the ultraviolet rays were irradiated on printed material and striking through of the ink was examined. The results are shown in the table below. As shown in the table, it is clear that striking through of the ink is effectively prevented by using the ultraviolet rays including infrared light.

| CM trans. (%) | 0 | 20 | 40 | 60 |
|---|---|---|---|---|
| CF trans. (%) | 40 | 40 | 40 | 40 |
| relative int. of infrared (when UV = 100) | 10 | 6.5 | 1.0 | 0.5 |
| Surface area | E | E | S | L |

("Surface area" means the surface area made by striking through of the emulsion ink when ten pieces of paper were printed: E=extremely small; S=small; and L=large. trans.=transmittance; int.=intensity).

Example 11

Emulsion ink further containing $SiO_2$ powder as extender (average particle size 0.5 $\mu$m) was prepared using the same manner described in Example 2.

Organic Phase

| Carbon Black (pigment) | 4.5 parts |
|---|---|
| Sorbitan trioleate (emulsifier, HLB 3.0) | 9.0 parts |
| Dibutylhydroxy toluene (antioxidant) | 0.1 parts |
| Spindle oil (solvent) | 19.0 parts |
| $SiO_2$ powder | 5.0 parts |

Aqueous Phase

| Water | 61.0 parts |
|---|---|
| Paraoxymethyl benzoate (antimold) | 0.1 parts |
| Polyacrylic acid | 0.4 parts |
| Triethanol amine | 0.4 parts |
| Ethylene glycol | 10.0 parts |
| Ultraviolet cure resin (Ecola-Coat #200DA: UV cure varnish, Material Science Co.) | 10.0 parts |

The organic phase was prepared by dispersing carbon black, sorbitan oleate, dibutylhydroxy toluene and $SiO_2$ in spindle oil using a three-roll dispersing apparatus and then diluting the resulting phase with spindle oil. After that emulsion ink was prepared using the same manner described in Example 2.

In the same manner described in Example 1, printed materials were produced using the resultant emulsion ink and clear images having no bleeding or striking through of the ink were obtained.

What is claimed is:

1. An ink in the form of a water-in-oil emulsion, comprising:
   a) an organic phase comprising at least one oil component,
   b) an aqueous phase dispersed in the organic phase,
   c) at least one aqueous ultraviolet curable compound of at least 3 wt %,
   d) an emulsifier, and
   e) at least one pigment; and
   said aqueous phase being made of gel.

2. The emulsion ink as claimed in claim 1, which comprises form 90 to 30 weight % of aqueous components and from 10 to 70 weight % of organic components.

3. The emulsion ink as claimed in claim 2, which comprises form 80 to 60 weight % of aqueous components and from 20 to 40 weight % of organic components.

4. The emulsion ink as claimed in claim 1, wherein said aqueous ultraviolet curable compound is an oligomer and is used in an amount of between 3 and 30 weight % relative to the total weight of the ink.

5. The emulsion ink as claimed in claim 1, wherein said aqueous ultraviolet curable compound is a monomer and is used in an amount of between 3 and 40 weight % relative to the total weight of the ink.

6. The emulsion ink as claimed in claim 1, wherein said at least one pigment is used in an amount of from 0.5 to 10 weight % based on the total weight of the ink, and is selected from the group consisting of carbon black, phthalocyanine blue, phthalocyanine green and lake red.

7. The emulsion ink as claimed in claim 1, having a viscosity of between 20 and 400 poises.

8. The emulsion ink as claimed in claim 1, which further comprises one or more compounds for increasing viscosity.

9. The emulsion ink as claimed in claim 8, wherein said one or more compounds for increasing viscosity are selected from the group consisting of polyacrylic acid, sodium polyacrylate and polyacrylate triethanolamine; and in an amount of 0.1. to 5.0 weight %.

10. The emulsion ink as claimed in claim 8, which further comprises one or more gelation accelerators.

11. The emulsion ink as claimed in claim 10, wherein said one or more gelation inhibitors are selected from the group consisting of di-isopropanol amine, di-2(ethylhexyl) amine, triamyl amine, b-dimethylaminopropionitrile, dodecyl amine, morpholine, sodium hydroxide, potassium hydroxide and ammonium hydroxide.

12. The emulsion ink as claimed in claim 1,
wherein said aqueous ultraviolet curable compound is one of an acrylic monomer and an acrylic oligomer.

13. The emulsion ink as claimed in claim 1,
wherein said aqueous ultraviolet curable compound is one of a polyfunctional monomer and a polyfunctional oligomer.

14. The emulsion ink as claimed in claim 1,
wherein said aqueous phase including one of a glycol having at least two hydroxyl groups, an amino alcohol having at least two hydroxyl groups and a mixture thereof.

15. The emulsion ink as claimed in claim 1,
wherein said emulsion ink further comprises an extender.

16. The emulsion ink as claimed in claim 1, wherein said organic phase including a non-ionic surfactant having a HLB value of equal to or less than seven.

* * * * *